F. E. CANDA.
METHOD OF AND APPARATUS FOR PRODUCING COMPOUND METAL INGOTS.
APPLICATION FILED SEPT. 6, 1911.
1,013,860.
Patented Jan. 9, 1912.
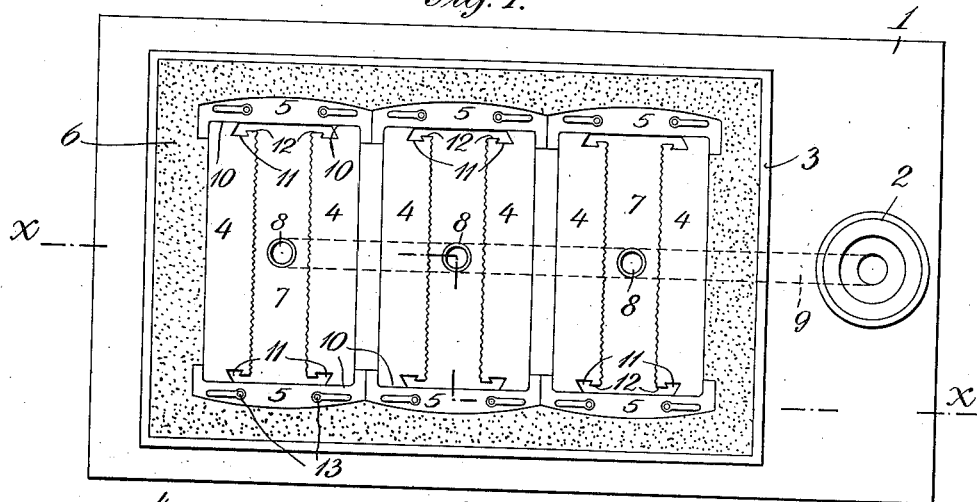
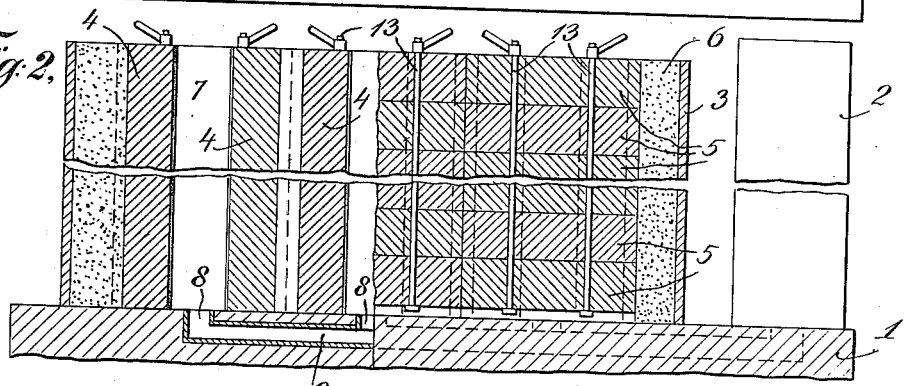
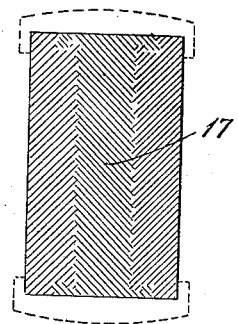
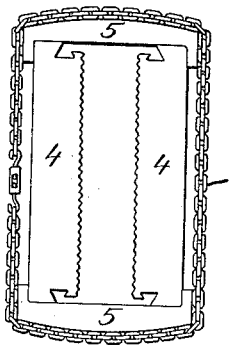
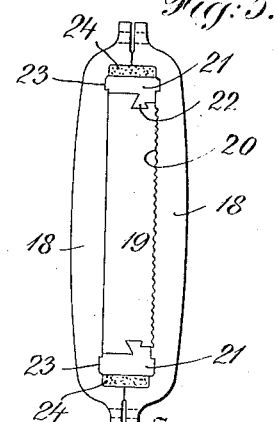
Witnesses:
Max B. A. Doring
Paul H. Frank
Inventor
Ferdinand E. Canda
By his Attorneys
Marble & Matty

UNITED STATES PATENT OFFICE.

FERDINAND E. CANDA, OF NEW YORK, N. Y., ASSIGNOR TO CHROME STEEL WORKS, OF CHROME, NEW JERSEY, A CORPORATION OF NEW JERSEY.

METHOD OF AND APPARATUS FOR PRODUCING COMPOUND METAL INGOTS.

1,013,860.            Specification of Letters Patent.        Patented Jan. 9, 1912.

Application filed September 6, 1911. Serial No. 647,958.

*To all whom it may concern:*

Be it known that I, FERDINAND E. CANDA, a citizen of the United States of America, and a resident of New York, in the county of New York and State of New York, have invented certain new and useful Methods of and Apparatus for Producing Compound Metal Ingots, of which the following is a specification.

My invention relates to improvements in methods of and means for producing composite metal plates, particularly plates composed of alternate layers of hard and soft steel, such as are used for vaults, safes, jail bars, etc. Such plates have often been made in the past by assembling together plates of different materials to be used, in the proper order, and welding them between rolls or in a press, as described in my Patent No. 726,026, dated April 21, 1903; and in my Patent No. 768,264, dated August 23, 1904, I describe a process for producing such plates wherein the hard steel is completely surrounded by soft steel, the said process involving placing hard steel plates in a mold and pouring molten soft steel around said hard steel plates.

The process herein described is particularly adapted and intended for producing composite plates the outer layers of which are of relatively hard steel (*i. e.*, steel having a relatively low melting point) while the inner layer is of soft steel (*i. e.*, steel having a relatively high melting point).

According to the present process, hard steel plates, to form the outer layers of the composite article, and grooved at their edges as hereinafter described, are placed the proper distance apart and end pieces or chills are applied across the ends of these plates, so as to inclose, with said hard steel plates, the space to be occupied by the soft steel, and then molten soft steel is poured into such space and caused to fill the said end grooves of said plates, whereby when the soft steel has solidified it is mechanically interlocked with the hard steel plates, so that said hard steel plates necessarily follow the soft steel during the contraction thereof, due to solidification and cooling. The soft steel so cast, having a higher melting point than the hard steel, tends to raise the adjacent surface of said hard steel plates to a welding temperature so that, as a result of the casting, a partial weld at least may be formed. Afterward the composite ingot thus produced is worked, as by rolling, hammering or pressing, and thereby the weld is perfected and completed.

My invention comprises casting one of the metals, specifically the metal of higher melting temperature, between bodies of the other metal, specifically the metal of lower melting point, and into end grooves of said bodies, whereby the objects between and against which the molten metal is so cast are caused to follow the cast metal during contraction due to solidification and cooling thereof, and further comprises a mold for forming composite metal articles, wherein two of the layers of the composite articles to be formed, and provided with end grooves as described, themselves form parts of the mold for the metal to be cast.

My invention further comprises sectional chills adapted to form the ends of such molds, and other features as hereinafter described.

The objects of my invention are to facilitate the making of composite metal objects, such as above described, to reduce the cost thereof, and to insure perfect welding together of the component layers.

I will now proceed to describe my invention with reference to the accompanying drawings, and will then point out the novel features in claims.

In the drawings: Figure 1 shows a top view of a plurality of molds, such as referred to, in place on a pouring table; Fig. 2 shows a longitudinal vertical section of the parts shown in Fig. 1, the section being taken on the line *x*—*x* of Fig. 1; Fig. 3 shows a transverse section of a composite metal ingot produced, as illustrated in Figs. 1 and 2; Fig. 4 is a top view of an alternative arrangement wherein the use of a flask to contain the metal plates and chills, is obviated; and Fig. 5 shows a top view of a mold such as is used for casting the side plates of the composite ingot.

Referring first to Figs. 1 and 2, 1 designates a pouring table, 2 a riser thereon, 3 a flask, 4—4 metal plates, to form the outer layers of the composite metal ingots to be formed, 5—5 end chills and 6 molding sand surrounding the chills and serving to hold said plates and chills in proper relative position prior to and during the pouring of the molten metal. Between each pair of plates 4 is a space 7 to receive the molten metal, the pouring table having in it orifices 8 connecting such spaces with the duct 9 leading from the riser 2. The plates 4 are provided with end faces 10 which the chills 5 bear, and with end grooves 11 and end lips 12 wherewith the cast metal will interlock so that, as said cast metal solidifies and shrinks, the plates 4 are compelled to follow such shrinkage, thereby insuring maintenace of surface contact of the plates 4 and the cast metal, during such solidification.

The end chills 5 are conveniently and customarily formed in sections as shown, and may be united by through bolts 13, whereby any possible displacement of these end chills is obviated.

In carrying out my invention, the plates 4 (which preferably are of relatively hard steel, that is, steel having a relatively low melting point) are placed within the flask, the end chills 5 are put in place, and sand is tamped around these plates 4 and chills 5 to hold them in place. If desired, the plates may be placed hot within the flask, and if desired, the surfaces of the plates may be covered with borax or other suitable flux before they are placed within the flask, to protect said plates against oxidation; or, and preferably, borax or other flux is placed within the spaces 7, where it will be melted by the molten metal first entering said spaces 7, and then, as the level of the molten metal in said spaces 7 rises, the said molten flux, floating on the surface of the molten metal, will progressively cleanse the surface of the plates 4 with which the molten metal is to contact.

The molds having been prepared as described, molten metal is poured into the riser 2 and flows through the duct 9 of the pouring table into the spaces 7 and fills said spaces including grooves 11 in the ends of the plates 4, and in solidifying mechanically interlocks the cast metal with these plates 4. The chills 5 are not provided with such grooves and therefore the molten metal does not unite with them. Owing to the mechanical interlocking of the cast metal and the plates 4, as said cast metal shrinks during cooling, the plates 4 are forced to follow such shrinkage, the pressure between the adjacent surfaces of said plates 4 and of the cast metal, thereby produced, and the contact of the relatively hot molten metal with the plates 4, usually forming at least a partial weld between the two metals. The composite ingots so formed may then be removed from the flask as units, and after reheating to a welding temperature the welds may be perfected, and the composite metal ingots reduced to the final form desired by rolling, pressing, hammering, etc.

Preferably the end grooves 11 are of dovetail form, being broader at the base than at the top, so that the metal cast between the plates 4 when it solidifies, has a dovetail interlock with each end of each plate 4. I find that this is important, as if the metal of the intermediate layer have not such dovetail interlock, or equivalent interlock with the ends of the plates 4, imperfectly welded product sometimes results; whereas I have found in actual practice that, with dovetail interlocking such as shown, perfect welding is obtained practically invariably. I also preferably provide grooves on the surfaces of the plates 4 which are to be adjacent to the intermediate layer cast between such plates, as such grooves materially facilitate the welding.

In Fig. 5 I illustrate a mold which I have found convenient for casting plates 4. The said mold comprises side plates 18 provided at their ends with customary means for securing them together, these side plates inclosing between them a space 19 into which the molten metal to form the plates 4 may be cast. As shown, one of the plates 18 has a grooved face 20 whereby the grooves to be provided on one face of each of the plates 4 may be formed. To form the dovetailed grooves 11 in the ends of the plates 4, I provide dry sand cores 21 at the ends of the space 19, each core 21 having a dovetail projection 22. These cores are provided at their sides with slightly projecting shoulders 23 fitting into corresponding grooves in the plates 18. Behind the cores 21 there are spaces 24, which spaces are customarily filled with sand, forming a backing for the cores.

It is not necessary to place the plates 4 and the chills 5 within a flask, as illustrated in Figs. 1 and 2. To the contrary, said chills 5 may be secured in place with relation to the plates 4 by other means, as for example by encircling chains or cables 16, as illustrated in Fig. 4.

It will be observed that in the process and by the apparatus above described, the metal plates 4 which are to form the outer layers of the composite ingots to be produced, and the end chills 5, themselves constitute the mold into which the molten metal is to be cast; the flask 3, if employed, being a mere means for holding the parts of the mold or molds in their proper relative positions with respect to each other and to the pouring orifices 8 of the pouring table.

In a divisional application, filed November 6, 1911, Sr. No. 658,889, I have claimed the ingot produced as above described, and comprising an intermediate layer and outer layers interlocked as described.

What I claim is:—

1. The process of forming composite metal ingots herein described, comprising casting molten metal to form an intermediate layer of the composite ingot into a space inclosed by plates and by separate end pieces, said plates being plates which are to form outer layers of the composite ingot, the said space into which the metal is so cast including interlocking spaces in the ends of said metal plates; and permitting the molten metal to solidify, and by the interlocking of the cast metal with said plates, thus produced, causing said plates to follow the cast metal during its contraction.

2. The process of forming composite metal ingots herein described, comprising casting molten metal of relatively high melting point to form an intermediate layer of the composite ingot into a space inclosed by plates of relatively lower melting point and by separate end pieces, said plates being plates which are to form outer layers of the composite ingot, the said space into which the metal is so cast including interlocking spaces in the ends of said metal plates; and permitting the molten metal to solidify and by the interlocking of the cast metal with said plates, thus produced, causing said plates to follow the cast metal during its contraction.

3. The process of forming composite metal ingots herein described, comprising casting molten metal to form an intermediate layer of the composite ingot into a space inclosed by plates and by separate end pieces, said plates being plates which are to form outer layers of the composite ingot, the said space into which the metal is so cast including interlocking spaces of dovetail contour in the ends of said metal plates; and permitting the molten metal to solidify, and by the interlocking of the cast metal with said plates, thus produced, causing said plates to follow the cast metal during its contraction.

4. A mold for forming composite metal ingots, comprising plates which are to form outer layers of the composite ingot, said plates having interlocking projections and corresponding recesses at their ends, the said plates being spaced apart a distance corresponding to the desired thickness of the intermediate layer of the composite ingot, and separate end pieces extending across the ends of said plates from the one plate to the other, and inclosing with said plates, the space between said plates and spaces behind said interlocking projections and communicating with the space between said plates, and means for holding said plates and end pieces together.

5. A mold for forming composite metal ingots, comprising plates which are to form outer layers of the composite ingot, said plates having interlocking projections and corresponding recesses at their ends, said recesses being of dovetail contour, the said plates being spaced apart a distance corresponding to the desired thickness of the intermediate layer of the composite ingot, and separate end pieces extending across the ends of said plates from the one plate to the other, and inclosing with said plates, the space between said plates and spaces behind said interlocking projections and communicating with the space between said plates, and means for holding said plates and end pieces together.

In testimony whereof I have signed this specification in the presence of two subscribing witnesses.

FERDINAND E. CANDA.

Witnesses:
PAUL H. FRANK,
D. A. DAVIES.